United States Patent

Kubo et al.

[11] Patent Number: 4,598,617
[45] Date of Patent: Jul. 8, 1986

[54] TOOL HOLDER ASSEMBLY HAVING CUTTING FLUID SUPPLY CIRCUIT

[75] Inventors: Haruaki Kubo; Yoshiyuki Kamanaka, both of Nara, Japan

[73] Assignee: Daishowa Seiki Co., Ltd., Osaka, Japan

[21] Appl. No.: 671,512

[22] Filed: Nov. 15, 1984

[30] Foreign Application Priority Data

Dec. 7, 1983 [JP] Japan .................. 58-189632[U]

[51] Int. Cl.$^4$ .............................. B23B 51/06
[52] U.S. Cl. .................. 82/36 R; 29/DIG. 63; 29/DIG. 70; 279/20; 407/11; 408/59
[58] Field of Search ................ 408/56–61; 173/75; 407/11; 82/36 R; 29/DIG. 55, DIG. 67, DIG. 68, DIG. 70, DIG. 63; 279/20

[56] References Cited

U.S. PATENT DOCUMENTS 3,781,024 12/1973 Ganser et al. .................. 408/59

FOREIGN PATENT DOCUMENTS 55-15946 4/1980 Japan .................. 408/56

Primary Examiner—Francis S. Husar
Assistant Examiner—Jerry Kearns
Attorney, Agent, or Firm—Koda and Androlia

[57] ABSTRACT

A tool holder assembly which comprises a tool holder adapted to be connected with a machine spindle for rotation together therewith, a stationary support member for rotatably supporting the tool holder and adapted to be connected to a fixed portion of the machine, a fluid supply circuit defined in the tool holder for the supply of a cutting fluid from an external source thereof towards a fluid discharge passage defined in a machine tool replaceably carried by the tool holder, and a vane-type displacement pump for forcibly pumping the cutting fluid from the fluid supply circuit to the fluid discharge passage in the machine tool for pouring the cutting fluid onto the workpiece being machined by the cutting tool. The displacement pump has its rotor constituted by a portion of the tool holder, and a pump casing constituted by a portion of the stationary support member.

4 Claims, 4 Drawing Figures

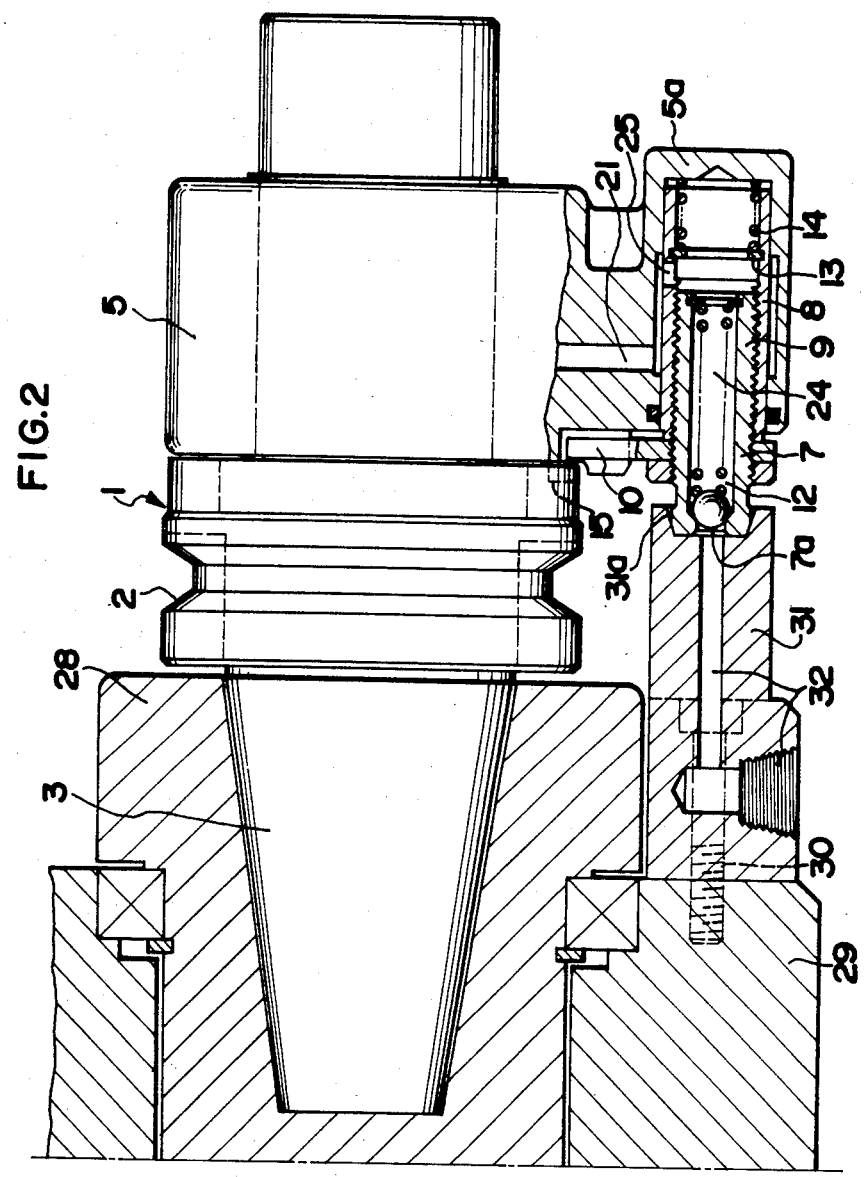

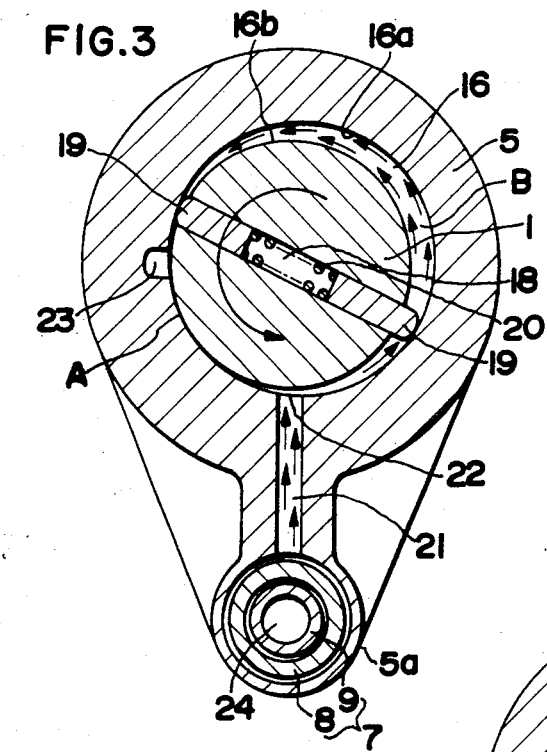
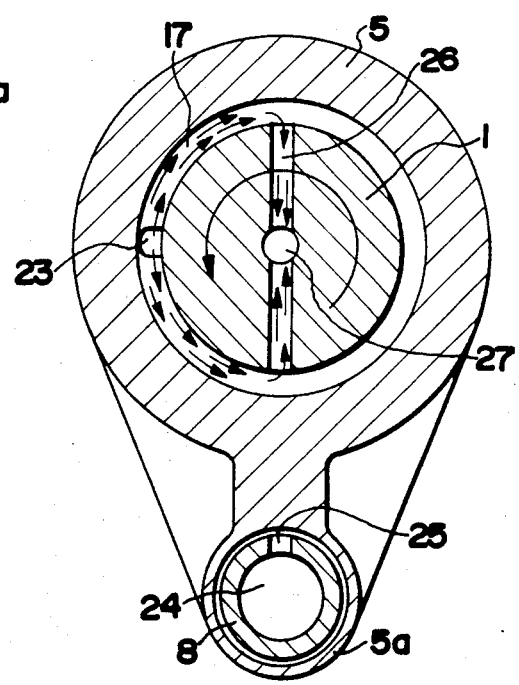

TOOL HOLDER ASSEMBLY HAVING CUTTING FLUID SUPPLY CIRCUIT

BACKGROUND OF THE INVENTION

The present invention generally relates to a tool holder assembly for the support of a machine tool such as, for example, a reamer, a cutting tool or a cutter, and more particularly, to a tool holder assembly of a type having a cutting fluid supply circuit for pouring a cutting fluid therethrough onto a workpiece being machine-processed.

Numerous machine tools having a cutting fluid supply circuit defined therein are currently commercially available. When in use, the machine tool is mounted on a particular machine, for example, a lathe, with the cutting fluid supply circuit communicated with an external source of cutting fluid, and the machine process proceeds while the cutting fluid is poured onto the workpiece being machine-processed. The purpose of the use of the cutting fluid varies depending on the type of the cutting fluid used and, in most cases, an oil type cutting fluid is widely used for the purpose of concurrently lubricating and cooling the machine tool as well as the workpiece being machine-processed. In view of this, the machine tool having the cutting fluid supply circuit is generally considered advantageous and convenient in that, since the machine tool can readily be lubricated and cooled by the cutting fluid being poured through the cutting fluid supply circuit defined in the machine tool, not only can the workpiece being machine-processed be smoothly machined, but also the life time of the machine tool can be increased.

Since this type of machine tool is, when in use, mounted on a tool holder removably or permanently secured to a rotary spindle of a machine for rotation together therewith, the cutting fluid supply circuit defined in the machine tool must be communicated with a cutting fluid supply circuit defined in the tool holder in order for the cutting fluid from the external source thereof to be supplied to the cutting tool by way of the tool holder. Hitherto, two methods are employed for the supply of the cutting fluid from the external source thereof to the fluid supply circuit in the tool holder. One of them is to supply the cutting fluid to the fluid supply circuit in the tool holder through a fluid passage, defined in a stationary support member supporting the tool holder rotatably, by way of an annular passage defined at the interface between the rotatable tool holder and the stationary support member, and the other is to supply the cutting fluid to the fluid supply circuit in the tool holder directly through a fluid supply passage defined in the spindle.

However, in either of these conventional fluid supply methods, the pressure under which the cutting fluid flows from the external source towards the fluid supply circuit in the machine tool depends on, and is solely derived by, the discharge pressure of the pump forming a part of the external source of the cutting fluid. Accordingly, in the event of the occurrence of the loss of pressure during the supply of the cutting fluid from the pump towards the fluid supply circuit in the machine tool, either the insufficient pouring of the cutting fluid onto the workpiece being machine-processed, or the interruption of the fluid pouring, tends to take place. Therefore, according to any one of the above described conventional methods, for the stabilized supply of the cutting fluid under the constant pressure throughout the entire circuit from the cutting fluid source to the fluid supply circuit in the machine tool, the external fluid source is require to employ a relatively expensive and bulky pump capable of exerting a relatively high discharge pressure, the use of such a pump being susceptible to the leakage of the cutting fluid during the supply thereof from the pump towards the machine tool and also to the problem associated with the ecomony of the machine processing.

Specifically, in the method wherein the cutting fluid is supplied to the tool holder through the fluid passage, defined in the stationary support member, by way of the annular passage defined at the interface between the rotatable tool holder and the stationary support member, a centrifugal force acts on the cutting fluid, flowing in a direction conforming to the direction of rotation of the tool holder, in a direction counter to the direction of flow of the cutting fluid. Therefore, this conventional method has an additional disadvantage in that the pressure of the cutting fluid being poured onto the workpiece is considerably reduced.

SUMMARY OF THE INVENTION

Accordingly, the present invention has been developed with a view to substantially eliminating the above described disadvantages and inconveniences inherent in the prior art systems and has for its essential object to provide an improved tool holder assembly having a fluid supply circuit, which is effective to ensure the constant pressure of the cutting fluid being poured onto the workpiece being machine-processed.

In order to accomplish this object, the present invention provides an improved tool holder assembly which comprises a tool holder adapted to be connected with a spindle of a machine for rotation together therewith, a stationary support member for rotatably supporting the tool holder and adapted to be connected to a fixed portion of the machine, a fluid supply circuit defined in the tool holder for the supply of the cutting fluid from the external source thereof towards a fluid discharge passage defined in a machine tool removably carried by the tool holder, and a vane-type displacement pump assembly comprising a rotor, constituted by a portion of the tool holder, and a pump casing constituted by a portion of the stationary support member, said vane-type displacement pump assembly being operable to forcibly pump the cutting fluid, which has been supplied from the external source thereof to the fluid supply circuit, towards the fluid discharge passage in the machine tool.

According to the present invention, even if the pressure of the cutting fluid supplied from the external source thereof to the fluid supply circuit in the tool holder is insufficient for the cutting fluid to flow towards the fluid discharge passage in the machine tool fitted to the tool holder and then to be poured onto the workpieces being machined through the fluid discharge passage, the cutting fluid so supplied can be automatically pressurized by the vane-type displacement pump assembly built in the tool holder assembly to compensate for the reduction in pressure, and therefore, the cutting fluid can be with no fault supplied under a predetermined pressure onto the fluid discharge passage in the machine tool and then poured onto the workpiece being machined.

Moreover, since the pump rotor and the pump casing are concurrently constituted by the respective portions of the tool holder and the stationary support member, neither an extra drive for the vane-type displacement pump assembly nor a special control device operable to control the start and stop of the vane-type displacement pump assembly are required and the vane-type displacement pump can be fabricated at substantially reduced cost with the minimized number of component parts.

BRIEF DESCRIPTION OF THE DRAWINGS

This and other objects and features of the present invention will become readily understood from the following description taken in conjunction with a preferred embodiment thereof with reference to the accompanying drawings, in which:

FIG. 2 is a side view of the tool holder assembly of FIG. 1 with a portion cut away, said tool holder assembly being shown as connected to a rotary spindle of a machine;

FIG. 3 is a cross sectional view taken along the line III—III shown in FIG. 1; and FIG. 4 is a cross sectional view taken along the line IV—IV in FIG. 1.

DETAILED DESCRIPTION OF THE EMBODIMENT

Figure 1:
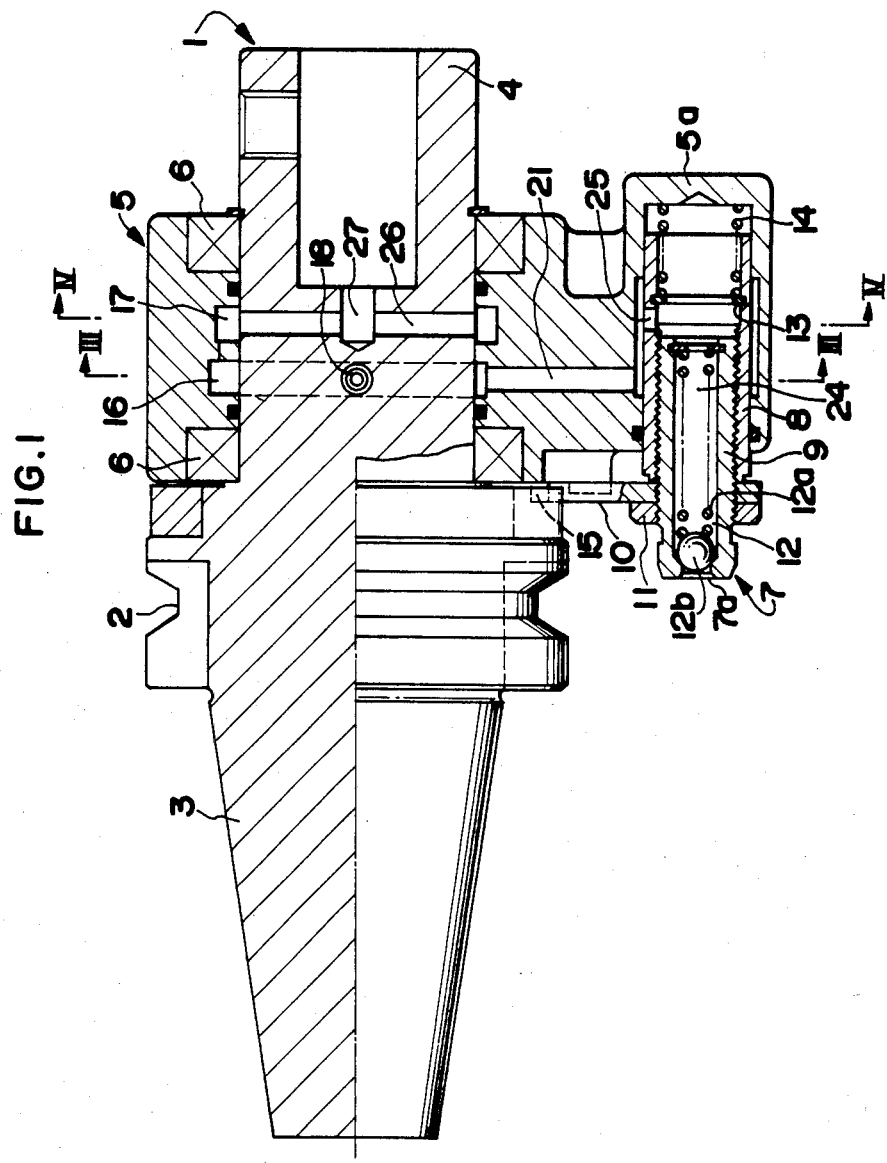
FIG. 1 is a longitudinal sectional view of a tool holder assembly embodying the present invention.

Before the description of the present invention proceeds, it is to be noted that like parts are designated by like reference numerals throughout the accompanying drawings.

Referring first to FIG. 1, reference numeral 1 represents a generally elongated tool holder of circular cross-section having one end formed into an outwardly tapering shank 3, the oppositeend of said tool holder 1 being formed into a socket 4 for receiving a machine tool (not shown) of a type having a fluid discharge passage defined therein. The tool holder 1 also has an engagement ring 2 rigidly mounted on, or otherwise integrally formed with, a substantially intermediate portion thereof, which ring 2 is used for the engagement with an manipulator arm (not shown) when one machine tool is desired to be replaced together with the associated tool holder 1.

Reference numeral 5 representsa generally ring-shaped stationary support member rotatably mounted on a portion of the tool holder 1 between the engagement ring 2 and the socket 4 by means of a pair of spaced bearings 6. This stationary support member 5 is, when the tool holder assembly is in use, coupled to a nonrotatable portion of the machine in a manner as will described later for permitting the tool holder 1, with the shank 3 coupled to a machine spindle 28 (FIG. 2), to be driven in one direction together with the machine spindle 28 relative to the stationary support member 5. For this purpose, the stationary support member 5 has formed integrally therewith a lateral projection in which a cylindrical chamber 5a defined therein. The cylindrical chamber 5a has its longitudinal axis extending in paralel to the longitudinal axis of the tool holder 1 and accommodate therein a fluid coupling device 7 of a construction which will now be described. It is to be noted that the fluid coupling device 7 concurrently acts as a means for prohibiting the stationary support member 5 from being rotated together with the tool holder 1.

As best shown in FIGS. 1 and 2, the fluid coupling device 7 comprises an outer sleeve 8 axially slidably accommodated within the cylindrical chamber 5a, and an inner sleeve 9 threadingly inserted in the outer sleeve 8 for axially telescopical movement relative to the outer sleeve 8. A compression spring 14 is interposed between a spring seat member 13, secured to the outer sleeve 8, and the bottom of the cylindrical chamber 5a for urging the outer sleeve 8 with a left-hand end of said outer sleeve 8 consequently positioned exteriorly of the cylindrical chamber 5a. Unless the tool holder assembly is in use with the shank 3 coupled drivingly to the machine spindle 28 as shown in FIG. 2, the stationary support member 5 is locked in position on the tool holder 1 and will not be rotatably relative to the tool holder 1. For this purpose, a positioner plate 10 mounted on the inner sleeve 9 and fixedly held in position between the left-hand end of the outer sleeve 8 and a lock nut 11 exteriorly threaded to the inner sleeve 9 to clamp said positioner plate 10 therebetween extends radially outwardly of the inner sleeve 9 and terminates within a detent groove 15 defined in the tool holder 1. It is to be noted that the disengagement of the positioner plate 10 from the detent groove 15 to permit the tool holder 1 to be rotated relative to the stationary support member 5 takes place when the tool holder 1 is mounted on the machine with the shank 3 drivingly coupled to the machine spindle 28 and the outer sleeve 8 is axially inwardly displaced against the compression spring 14 together with the iner sleeve 9 in a manner aswill be described later.

A left-hand end of the inner sleeve 9 positioned exteriorly of the outer sleeve 8 as viewed in FIGS. 1 and 2 is radially inwardly constricted to provide a fluid intake port 7a which is normally closed by a check valve 12. This check valve 12 comprises a ball 12b of a diameter slightly smaller than the inner diameter of the inner sleeve 9, but greater than the diameter of the fluid intake port 7a, and a compression spring 12a housed within the inner sleeve 9 and urging the ball 12b in one direction leftwards, as viewed in FIGS. 1 and 2, so as to close the fluid intake port 7a. The fluid intake port 7a, normally closed by the check valve 12 in the manner as hereinabove described, is communicateable through the hollow 24 of the iner sleeve 9 with the cylindrical chamber 5a which is in turn communicated with a radial passage 21, defined in the stationary support member 5, through at least one connecting hole 25 defined in the wall of the outer sleeve 8 so as to extend completely through the thickness of said wall of the outer sleeve 8.

The inner peripheral surface 16a of the stationary support member 5, which slidingly contacts and encircles the outer peripheral surface of the tool holder 1, is formed with first and second annular grooves 16 and 17 spaced a distance from each other in a direction axially of the tool holder 1 and communicated with each other by means of an axial passage 23 (FIGS. 3 and 4) defined in the stationary support member 5 so as to extend in a direction parallel to the longitudinal axis of the tool holder 1. As best shown in FIG. 3, the first anular groove 16 has a depth varying over the circumference thereof from a minimum value to a maximum value and then from the maximum value down to the minimum value, with the bottom 16a thereof depicting the shape of a right circle eccentric with respect to the longitudinal axis of the tool holder 1. In FIG. 3, reference character A represents the area of the first annular groove 16 where the depth is of the minimum value and the bottom 16a thereof is generally in flush with the inner peripheral surface 16b of the stationary support member 5, while reference character B represents the area of the first annular groove 16 where the depth is of the maximum value, said maximum depth area B being circumferentially opposed to the minimum depth area A. On the other hand, the second annular groove 17 has, as best shown in FIG. 4, a depth equal over the entire circumference thereof with the bottom thereof depicting the shape of a right circle concentrical with the longitudinal axis of the tool holder 1.

It is to be noted that the first annular groove 16 defines a first annular fluid passage in cooperation with the peripheral surface of that portion of the tool holder 1 aligned therewith whereas the second annular groove 17 defines a second annular fluid passage in cooperation with the peripheral surface of that portion of the tool holder 1 aligned therewith.

As best shown in FIGS. 1 and 3, the tool holder 1 has a radial bore 18 defined therein so as to extend completely through the diameter of the tool holder 1 with its opposite openings aligned with the first annular groove 16. A pair of generally rod-like vane members 19 are housed within the radial bore 18 in the tool holder 1 for sliding movement in a direction axially thereof and are normally biased by a compression spring 20, housed within the radial bore 18 and interposed between these vane members 19, so as to separate away from each other in a direction radially outwardly of the tool holder 1. With the vale members 19 so arranged and so positioned in the radial bore 18, respective outer ends of the vane members 19 remote from the compression spring 20 are slidingly engaged in the first annular groove 16 so that, during the rotation of the tool holder 1 relative to the stationary support member 5, the vane members 19 sweep the wall defining the first annular groove 16 while dividing the first annular fluid passage, defined by the first annular groove 16 and the outer peripheral surface of that portion of the tool holder 1, into two circumferentially spaced compartments.

One of the opposite open ends of the axial passage 23 adjacent the first annular groove 16, that is, the first annular fluid passage, is opened in communication therewith at a location adjacent the minimum depth area A and on the trailing side with respect to the direction of rotation of the tool holder 1, as shown by the arrow in FIG. 3, relative to the stationary support member 5, the other of said open ends of said axial passage 23 being communicated with the second annular groove 17, that is, the second annular fluid passage, as shown in FIG. 4. On the other hand, the radial passage 21 defined in the stationary support member 5 in communication with the cylindrical chamber 5a as hereinbefore described has an open end 22 communicated with the first annular groove 16, which open end 22 is located adjacent the minimum depth area A and on the leading side with respect to the direction of rotation of the tool holder 1, that is, on one side of the minimum depth area A opposite to the open end of the axial passage 23.

Thus, it will readily be seen that the hollow 24 of the inner sleeve 9 in the fluid coupling device 7 is fluid connected with the first annular fluid passage through the connecting hole 25 in the outer sleeve 8 and then through the radial passage 21.

Referring now to FIGS. 1 and 4, the tool holder 1 also has a radial fluid passage 26 defined therein so as to extend completely through the diameter of the tool holder 1 with its opposite openings aligned with the second annular groove 17, and an axial fluid passage 27 defined therein in alignment with the longitudinal axis of the tool holder 1, said axial fluid passage 27 having one end in communication with the radial fluid passage 26 and the other end opened into the socket 4 of the tool holder 1. It is to be noted that said other end of the axial fluid passage 27 opened into the socket 4 will be fluid-connected with the fluid discharge passage, defined in the machine tool (not shown), when the latter is drivingly connected with the socket 4, so that the cutting fluid, supplied into the fluid discharge passage in a manner as will be described later, can be poured through a discharge port at the machine tool onto the workpieces being machined.

While the tool holder assembly according to the present invention is constructed as hereinbefore described, it may be utilized in practice in a manner similar to any conventional tool holder assembly. This will now be described.

The tool holder 1 having the socket 4 to which any known machine tool having the fluid discharge passage defined therein is drivingly connected in any known manner is mounted on the machine with the shank 3 inserted into the machine spindle 28 by the aid of any known manipulator. The manipulator referred to in this context is an industrial robot having an manipulator arm operable to replace or mount the tool holder 1 in relation to the machine.

At the time of mounting of the tool holder 1 on the machine, not only is the shank 3 inserted into the machine spindle 28, but the fluid coupling device 7 has to be fluid-connected with a fluid supply passage 32 defined in a coupling attachment 31 rigidly secured to a fixed portion 29 of the machine by means of one or more set bolts 30. For this purpose, a free end of the coupling attachment 31 remote from the fixed portion 29 of the machine is formed with a connecting socket 31a in alignment with the fluid supply passage 32, which connecting socket 31a is adapted to receive the outer end of the inner sleeve 9 where the fluid intake port 7a is defined. It is to be noted that the end of the fluid supply passage 32 opposite to the connecting socket 31a is adapted to be fluid connected to a source of cutting fluid to be poured onto the workpiece (not shown) being machined. Thus, it will readily be seen that the tool holder 1 carrying the machine tool is drivingly connected into the machine spindle 28 with the outer end of the inner sleeve 9 alingned with and received in the connecting socket 31a to complete a fluid circuit between the fluid supply passage 32 and the hollow 24 in the inner sleeve 9.

As the outer end of the inner sleeve 9 is received in the connecting socket 31a in the coupling attachment 31, both of the inner and outer sleeves 9 and 8 are axially inwardly retracted against compression spring 14 and into the cylindrical chamber 5a, accompanied by the displacement of the positioner plate 10 in a direction rightwards as viewed in FIGS. 1 and 2. As a result thereof, the free end of the positioner plate 10 disengages from the detent groove 15 as shown in FIG. 2 so that, when the machine spindle 28 is driven in one direction in any known manner, the tool holder 1 can be rotated together with the machine spindle 28 relative to the stationary support member 5. It is to be noted that the disengagement of the free end of the positioner plate 10 from the detent groove 15 in the stationary support member 5 takes place simultaneously, or substantially simultaneously, with the complete mounting of the tool holder 1 on the machine spindle 28.

The position of the inner sleeve 9 relative to the outer sleeve 8 can be adjusted by turning one of the sleeves 8 and 9 relative to the other of the sleeves 8 and 9 in either direction about the longitudinal axis thereof. Therefore, the position assumed by the outer end of the inner sleeve 9 when the free end of the positioner plate 10 is engaged in the detent groove 15 can be adjusted to compensate for the difference in length of the coupling attachment 31 which may be observged in different types of processing machines.

Subsequent to the complete mounting of the tool holder with the machine tool on the machine spindle 28, the latter is driven in one direction in any known manner and, at the same time, the cutting fluid from the external source thereof has to be supplied under a predetermined pressure into the fluid supply passage 32, it being to be noted that, when and so long as the machine spindle 28 has been driven accompanied by the rotation of the tool holder 1 with the machine tool carried thereby, the intended machining process can be worked on the workpiece (not shown), supported by the machine tailstock, by means of the machine tool.

As the cutting fluid under the predetermined pressure is supplied into the fluid supply passage 32, the pressure of the cutting fluid within the passage 32 overcomes the biasing force of the spirng 12a to urge the ball 12b against the spring 12a to open the fluid intake port 7a with the consequence that the cutting fluid flows from the passage 32 into the hollow 24 of the inner sleeve 9 and then into the radial passage 21 through the connecting hole 25 in the outer sleeve 8. The cutting fluid entering into the radial passage 21 then flows into the first annular fluid passage defined by the first annular groove 16 and the outer peripheral surface of the tool holder 1.

The cutting fluid within the first annular fluid passage is positively pumped into the axial passage 23 and then into the second annular fluid passage, defined by the second annular grove 17 and the outer peripheral surface of the tool holder 1, in a manner which will now be described with particular reference to FIG. 3.

As shown in FIG. 3, during the continued rotation of the tool holder 1 in one direction as shown by the arrow relative to the stationary support member 5, the vane members 19 alternately retract and project with their outer end sweeping in sliding contact with the bottom 16a of the first annular groove 16. Accordingly, the cutting fluid entering the first annular fluid passage through the open end 22 of the radial passage 21 circulates around the tool holder 1 in a direction conforming to the direction of rotation of the tool holder 1 before it enters the axial passage 23. At this time, as each of the vane members 19 having moved past the minimum depth area A sweeps past the open end 22 of the radial passage 21, the volume of the portion of the first annular fluid passage which is in communication with the radial passage 23 and located on the trailing side of the vane member 19 with respect to the direction of rotation of the tool holder 1 increases with a suction force acting on the open end 22 of the radial passage 21 to draw the cutting fluid in the radial passage 21 into that portion of the first annular fluid passage. As one of the vane members 19 which has moved past the maximum depth area B approaches the minimum depth area A during the continued rotation of the tool holder 1 relative to the stationary support member 5, the portion of the first annular fluid passage on the leading side of said one of the vane members 19 with repsect to the direction of rotation of the tool holder 1 decreases in its volume with the cutting fluid therein being consequently compressed, permitting said cutting fluid to be forcibly discharged into the axial passage 23.

Thus, a mechanism for pumping the cutting fluid from the open end 22 to the axial passage 23 through the first annular fluid passage defined by the first annular groove 16 and the outer peripheral surface of the tool holder 1 constitutes a vane-type displacement pump and, accordingly, the cutting fluid so supplied can be forcibly pumped into the second annular fluid passage, defined by the second annular groove 17 and the outer peripheral surface of the tool holder 1, through the axial passage 23 after having been increased in pressure.

The cutting fluid so supplied into the second annular fluid passage through the axial passage 23 then flows through the radial fluid passage 26, defined in the tool holder 1, into the axial fluid passage 27 also defined in the tool holder 1, further flowing into the fluid discharge passage defined in the machine tool then coupled to the socket 4. Therefore, the cutting fluid flowing in the fluid discharge passage in the machine tool is subsequently discharged therefrom onto the workpieces being machined by the machine tool.

Although the present invention has fully been described in connection with the preferred embodiment thereof with reference to the accompanying drawings, it is to be noted that various changes and modifications are apparent to those skilled in the art. By way of example, although in the foregoing embodiment a portion of the stationary support member 5, the first annular groove 16, the vene members 19 operatively carried by the tool holder 1, the compression spring 20, the open end 22 of the radial passage 21 and the axial passage 23 have been shown and described as constituting the vane-type displacement pump with said portion of the stationary support member 5 and that portion of the tool holder 1 serving as the pump casing and the pump rotor, respectively, the details of the pump may not be limited to that shown and described. For example, although the first annular groove 16 has been described and shown as having its bottom 16a depicting the shape of the right circle eccentrical with the longitudinal axis of the tool holder 1, the bottom 16a of the first annular groove 16 may have any other shape than the shape of the eccentirical circle. In addition, although the vane-type displacement pump shown and described is of a so-called unbalanced design wherein only one intake port, that is, the open end 22, and only one discharge port, that is, the open end leading to the axial passage 23, are employed, it may be of a so-called balanced design wherein a pair of intake ports and a pair of discharge ports are employed.

Moreover, the rate of change in cross-sectional surface area of the first annular fluid passage in a direction circumferentially of the tool holder 1, the shape of each of the vane members 19, the number of the vane members 19 employed and the manner in which the vane members 19 are supported may be suitably chosen according to the design pressure of the cutting fluid to be discharged from the vane-type displacement pump. Yet, although the second annular fluid passage has been described and shown as comprised of the second annular groove 17, defined in the inner peripheral surface of the stationary support member 5, and the outer peripheral surface of the tool holder 1, it may be constituted by an annular groove, defined in the outer peripheral surface of the tool holder 1, and the inner peripheral surface of the stationary support member 5. In other words, the second annular groove 17 may be formed on the outer peripheral surface of the tool holder 1.

Furthermore, the tool holder assmebly shown in and described with reference to FIGS. 1 to 4 is of a type suited for use in the numerically controlled processing machine operatively coupled with the manipulator for the replacement of one of the machine tools with another. However, it will readily be conceived by those skilled in the art that the tool holder assembly embodying the concept of the present invention can equally be used in any type of processng machines of a type, for example, wherein the replacement of the tool holder requires the intervention of manual labor.

Further, with a slight modification effected to the tool holder assembly described and shown, it may be used in the machine wherein the fluid passage for the supply of the cutting fluid to the machine tool through the tool holder assembly is defined in the machine spindle.

Accordingly, such changes and modifications are to be construed as included within the true scope of the present invention as defined by the appended claims, unless they depart therefrom.

What is claimed is:

1. A tool holder assembly which comprises, in combination, a tool holder connected to a spindle of a machine for rotation together therewith, a stationary support member rotatably coupled to said tool holder for rotatably supporting the tool holder connected to a fixed portion of the machine, a fluid supply circuit defined in the tool holder for supplying a cutting fluid from an external source thereof towards a fluid discharge passage defined in a cutting tool, said cutting tool being replaceably connected to and carried by the tool holder, and a vane-type displacement pump assembly coupled to said fluid supply circuit comprising a rotor, constituted by a portion of the tool holder, and a pump casing constituted by a portion of the stationary support member, said rotor further having first and second cylindrical portions with said first cylindrical portion being smaller in diameter than said second cylindrical portion and with said second cylindrical portion having at least one vane projecting therefrom, said vane-type displacement assembly being operable to forcibly pump the cutting fluid, which has been supplied from the external source thereof to the vane-type displace-ment pump, towards the fluid discharge passage in the cutting tool.

2. A tool holder assembly as claimed in claim 1, wherein said stationary support member has an eccentric annular groove defined in an inner peripheral surface thereof, said annular groove having its bottom serving as a cam surface, said annular groove defining an annular fluid passage in cooperation with an outer peripheral surface of said tool holder, said annular fluid passage having a cross-sectional surface area varying in a direction circumferentially of the tool holder, said annular fluid passage having a fluid intake port which is coupled to said external supply and an outlet port which is coupled to said fluid supply circuit defined on respective sides of the area of the annular fluid passage where the crosssectional surface area is minimum and wherein said tool holder carries a plurality of vane members slidingly engaged in said annular groove.

3. A tool holder assembly as claimed in claim 2 further comprising a fluid coupling device provided in the stationary support member for coupling said external source of cutting fluid to said fluid intake and for prohibiing the stationary support member from being rotated together with the tool holder.

4. A tool holder assembly as claimed in claim 3, wherein said fluid coupling device comprises:
   a cylindrical chamber formed in said stationary support member;
   an outer sleeve axially slidably accommodated within said cylindrical chamber;
   an inner sleeve thoroughly inserted into said outer sleeve for axial telescopic movement relative to said outer sleeve;
   a compression spring means provided in said cylindrical chamber between said outer sleeve and a bottom of said cylindrical chamber;
   a detent groove provided in said tool holder;
   a positioner plate which is threadedly mounted on said inner sleeve and which extends from said inner sleeve into said detent groove in said tool holder; and
   a lock nut threadably provided on said inner sleeve and engaging with said positioner plate for fixedly holding said positioner plate in position.

* * * * *